July 20, 1943.   M. A. CLAESSON   2,324,557
GASEOUS ELECTRICAL DISCHARGE DEVICE
Filed June 3, 1941
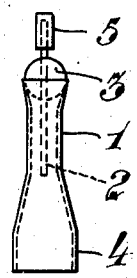
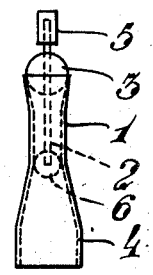
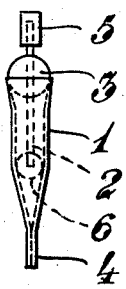
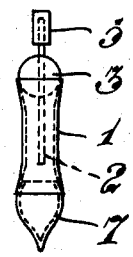
Inventor
Martin A. Claesson
by Sommers & Young
Attorneys

Patented July 20, 1943

2,324,557

UNITED STATES PATENT OFFICE 2,324,557

GASEOUS ELECTRICAL DISCHARGE DEVICE

Martin Andreas Claesson, Stockholm, Sweden, assignor to Aktiebolaget Bofors, Bofors, Sweden, and Aktiebolaget Standard Radiofabrik, Stockholm, Sweden, both Swedish joint-stock companies Application June 3, 1941, Serial No. 396,477
In Sweden July 12, 1939

5 Claims. (Cl. 250—27.5)

This invention relates to gaseous electric discharge devices having two electrodes one of which consists of a cold cathode particularly adapted for use in electrical timing systems for projectiles, such as shells or the like comprising such a device as an essential component, and has for its object to provide a device of this type having high mechanical strength, small volume and constant electrical characteristics.

In such application of a gaseous discharge device high mechanical strength is required in order that the discharge device may effectively resist the inertia forces produced in firing off the projectile. These forces are of an order of magnitude entirely different from that of the forces which such discharge devices hitherto constructed can withstand and may amount to 50 kilograms per gram or more. Small volume of the discharge device is necessary for the reason that the space accessible in the projectile as a rule is very limited. The electrical requirements follow from the present application of the discharge device, an exactly defined and constant starting voltage and a high current conductivity in relation to the dimensions of the tube being particularly important in this respect. As anyone familiar with the art knows the difficulties in producing constant electrical properties in manufacturing gaseous discharge devices of small size increase with decrease of the dimensions of such devices.

Attempts have been made to produce gaseous discharge devices for the purpose referred to according to the methods hitherto commonly practised, using a tubular glass vessel and sealing in the two electrodes at the ends of said vessel, the latter being hermetically sealed after exhausting and filling with gas. In practice it has, however, been found that gaseous discharge devices made in this manner break when applied for the purpose referred to due to the inertia forces of the electrodes in firing-off the projectile, it being necessary to use rather strong and stable electrodes in an endeavour to maintain the desired electrical properties of the discharge device. Attempts were made to avoid this difficulty by embedding the discharge device in suitable substances, however, without success due to the small space accessible in the projectile.

According to the present invention a gaseous electrical discharge device having the abovementioned characteristics is provided by making said device of a tubular body of vacuum-tight metal used as one electrode, preferably as the cathode; one end of said tubular body being used for leading in the second electrode, preferably comprising a rod of metal, said end being vacuum-tightly sealed by means of a solid body of insulating material vacuum-tightly united thereto while the opposite end of said tubular body is used for exhausting and filling the tube with gas and then vacuum-tightly sealed. By constructing the gaseous discharge device in this manner said device will obtain such a high mechanical strength and stability that the tube can be fired-off together with the projectile without the risk of rupture or distortion of said device thus securing the desired timing. As to the remaining characteristics it is to be noted that the starting voltage of a gaseous discharge device varies with the distance between the electrodes, said distance when applying my invention being exactly defined. Besides, the starting voltage of a gaseous discharge device is to a large extent influenced by so called wall charges which obviously are reduced to a minimum in the discharge device according to my invention in which the discharge vessel substantially is made of metal and serves as one electrode. Thus, as the effect of wall charges is negligible in my device the volume thereof can obviously be reduced to a small fraction of that of the gaseous discharge device above described comprising a glass vessel in which the electrodes must be spaced at a considerable distance from the glass walls for eliminating said effect.

The starting and operating voltages of the present gaseous discharge device can be adjusted to the desired values by suitable choice of the composition and pressure of the gas-filling. Besides, the emissive characteristics of the electrodes can be improved by suitable activating processes. The present discharge device may preferably contain a rare gas or a metal vapor or both. The cathode can be activated by applying an electro positive substance or a mixture of such substances for the purpose of increasing the current conductivity of the discharge device. A radioactive substance can also be inserted in the discharge device whereby the preionisation of the mixture of gas of the tube in response to cosmic radiation may be maintained at a relatively constant value which assists in securing the exactly defined starting voltage.

In gaseous discharge devices the vessel of which is made of glass it is difficult to secure a predetermined pressure in the said devices due to the increase of temperature when fusing-off the exhausting tube for sealing the gaseous discharge device. This difficulty is particularly pronounced in gaseous discharge devices of small dimensions. In practising the invention this difficulty may be avoided by using the metal tube as exhaust tube and compressing it hermetically after the exhausting and filling operations.

The invention will be described in greater particulars in the following with reference to the accompanying drawing.

Figs. 1 and 2 show side and front views of a gaseous discharge device according to my invention.

Figs. 3 and 4 show side and front views of a modified form of the device according to Figs. 1 and 2.

Fig. 5 shows a gaseous discharge device the exhaust end of which is sealed in a modified manner.

The gaseous discharge device according to Figs. 1 and 2 comprises an internal electrode consisting of a rod 2 of metal passing through a solid body of a suitable insulating material, preferably glass, a ceramic substance or the like, for instance, in the form of a globule 3 and vacuum-tightly united thereto intermediate its ends. The second electrode consists of a tubular body 1 made of a vacuum-tightly compressed metal, such as copper. The tubular body 1 is vacuum-tightly sealed at the upper end by means of the globule 3 and at the lower end by compressing the tubular body 1 at 4. At the upper end of rod 2 a sleeve 5 is provided for receiving one of the conductors serving to connect the gaseous discharge device in circuit, the other conductor being suitably connected to the tubular body 1. The latter is preferably used as a cathode whereby the current conductivity of the gaseous discharge device can be materially increased.

As may be seen from the drawing the tubular body 1 is expanded at its upper end to receive the globule of glass 3. If the gaseous discharge device is mounted in such a manner in the projectile that the inertia forces produced in firing-off the projectile tend to press the globule 3 into the tubular body 1 then said globule will substantially be subjected to pressure. The compressive strength of glass being a multiple of the tensile strength thereof this property of glass is thus utilised according to the invention to attain an increased strength of the gaseous discharge device. Preferably, the tube 1 encloses about one half of the globule 3 and approaches said globule substantially tangentially whereby the forces of pressure produced will be directed towards the centre of the globule 3.

The vacuum-tight joint between the insulating body 3 and the metallic tubular body 1 can be secured in ordinary manner. The conditions for obtaining such a joint are that the coefficients of expansion of the glass and the metal substantially agree or that the metal possesses a certain resiliency to enable the tubular body 1 to follow the changes of the dimensions of the glass without impairing the vacuum-tight joint.

The gaseous discharge device shown in Figs. 3 and 4 differs from that illustrated in Figs. 1 and 2 only in the respect that an insulating body 6 is secured to the inner end of the electrode 2 to improve the securing and aligning of this electrode in the tubular envelope 1. If desired the insulating body 6 which may consist, for instance, of a globule of glass may be secured to the tubular body 1 by a wellknown glass to metal joint.

In the embodiment illustrated in Fig. 5 the tubular body 1 of metal is sealed off at its lower end by means of a hood-shaped part 7 formed by the end of the exhaust tube which in this case consists of glass.

Although the gaseous discharge device according to the invention is particularly adapted for use in electrical timing devices for artillery projectiles or the like, said device obviously may also be applied for other purposes in which similar requirements are to be satisfied.

What I claim is:

1. A method of manufacturing a gaseous electrical discharge tube comprising vacuum-tightly uniting a solid body of insulating material to a metallic rod intermediate the ends thereof, vacuum-tightly sealing one end of a tubular body of vacuum-tightly compressed metal by said body, exhausting and gas-filling said tubular body at its opposite end, and vacuum-tightly sealing said tubular body at a distance from the inner end of said rod.

2. The method of manufacturing gaseous electrical discharge tubes comprising vacuum-tightly uniting a solid body of insulating material to a metallic rod intermediate the ends thereof, vacuum-tightly sealing one end of a metallic tube by said body, exhausting the air from said tube from the end opposite the end sealed by said body, filling the tube with gas from said opposite end, and vacuum-tightly sealing said opposite end of the tube by pressing the side walls of said opposite end together at a distance from the inner end of said rod.

3. The method of manufacturing gaseous electrical discharge tubes comprising vacuum-tightly uniting a solid body of insulating material to a metallic rod intermediate the ends thereof, applying a solid mass of insulating material to said rod concentrically therewith at a point spaced from said body of insulating material, inserting said rod and mass of insulating material into a tube having approximately the same internal diameter as the diameter of said mass, vacuum-tightly sealing one end of said tube by said body, exhausting the air from said tube from the end opposite the end sealed by said body, filling the tube with gas from said opposite end, and vacuum-tightly sealing said opposite end of the tube by pressing the side walls of said opposite end together at a distance from the inner end of said rod.

4. A gaseous electrical discharge tube having small volume, high mechanical strength and constant electrical characteristics, particularly for use in electrical timing systems for projectiles and comprising two electrodes only, one of which consists of a cold cathode, said tube consisting of a tubular body of vacuum-tight metal forming one electrode, one end of said tube being outwardly flared, the other electrode comprising a rod having a body of insulating material gas-tightly secured thereto intermediate its ends, said rod extending into said tube in space relation to the walls of said tube, the body of insulating material on said rod being gas-tightly secured in the flaring part of said tube end and the opposite end of said tube being vacuum-tightly sealed.

5. A gaseous electrical discharge tube having small volume, high mechanical strength and constant electrical characteristics, particularly for use in electrical timing systems for projectiles and comprising two electrodes only, one of which consists of a cold cathode, said tube consisting of a tubular body of vacuum-tight metal forming one electrode, one end of said tube being outwardly flared, the other electrode comprising a rod having a body of insulating material gas-tightly secured thereto intermediate its ends, said rod extending into said tube in spaced relation to the walls of said tube, the body of insulating material on said rod being gas-tighly secured in the flaring part of said tube end and the opposite end of said tube being outwardly flared forming a cup-like portion and a globule of glass gas-tightly sealing said opposite end of the tube.

MARTIN ANDREAS CLAESSON.